United States Patent Office 3,097,131
Patented July 9, 1963

3,097,131
EUTECTIC LIQUID PRESERVATIVES
Ryuzo Ueno, Nishinomiya City, Yoshihiko Saito, Osaka City, and Toshio Matsuda, Sakai City, Japan; said Saito and Matsuda assignors to Ueno
No Drawing. Filed Apr. 1, 1960, Ser. No. 19,185
Claims priority, application Japan Apr. 9, 1959
1 Claim. (Cl. 167—31)

The present invention relates to a preservative in liquid form at room temperature containing one species of p-hydroxybenzoic acid esters as one of the integral components.

Generally speaking, p-hydroxybenzoic acid esters have hitherto been employed in the art independently of one another, not in the form of mixtures like those of this invention. The preservative efficacy and solubility of said esters, furthermore, are diametrically opposing due to the difference in the ester radicals. For instance, n-butyl p-hydroxybenzoate has a relatively high order of preservative efficacy but is hardly soluble in water at room temperature. Methyl p-hydroxybenzoate, on the other hand, dissolves in water relatively easily, but the preservative efficacy thereof is about ⅒ that of n-butyl p-hydroxybenzoate. In addition, said p-hydroxybenzoic acid esters being usually solid at room temperature, it is impracticable, for instance, to form a protective film on the article to be protected. The range of application of said esters in the art, therefore, has been limited to a considerable extent.

A primary object of this invention is accordingly to provide a new series of substances, namely, a series of eutectic compounds and mixtures which are liquid at room temperature, and each of which has at least one species of p-hydroxybenzoic acid esters as an indispensable component, so that aforesaid defects and other incidental drawbacks or inconveniences inherent in the conventional independent use of said esters are substantially removed.

This invention is based upon our discovery that 2 or more species of p-hydroxybenzoic acid esters, when melted with one another in a specific proportion, form a liquid preservative composition which is liquid at room temperature. The same result is obtained when one or more species of said esters are melted with one or more species of specific substances other than said esters.

Furthermore, the p-hydroxybenzoic acid esters in the liquid products of this invention are less volatile and non-crystallizing. Such being the case, the liquid preservative substances of this invention are very convenient and efficacious, covering wide range of application.

More specifically stated, the liquid preservative substances of this invention are obtained from a series of mixtures, one type of which consists of 2 or more species of p-hydroxybenzoic acid esters, and the other type comprises one or more species of said esters and one or more species of such substances as α-methyl naphthoquinone, dehydroacetic acid, salicylic acid, sorbic acid, butyl hydroxyanisole, butyl hydroxytoluene, 2,4,5-trichlorophenol, n-propyl gallate and i-amyl gallate. In melting one species of p-hydroxybenzoic acid esters with one species of the substances other than said esters, α-methyl naphthoquinone, dehydroacetic acid, sorbic acid and butyl hydroxyanisole are preferred. In all instances the products of this invention, however, at least one species of p-hydroxybenzoic acid esters is contained. The p-hydroxybenzoic acid esters employed in this invention are alkyl esters like methyl, ethyl, n-propyl, i-propyl, n-butyl, i-butyl, sec-butyl, n-amyl and i-amyl ester. The benzyl ester is also employed.

To obtain the desired substance of this invention, the components of any of mixtures of aforesaid types are heated to a temperature which is lower than the highest melting point of the components, and the melt is allowed to cool at room temperature. In practice, however, a temperature slightly over the freezing point of the product to be obtained suffices, since the unmelted portion of the mixture melts into the melted portion. When the freezing point of a product to be obtained is remarkably low, the mixture may be allowed to melt at room temperature, or the mixture may be tritulated without heating my means of a ball mill or a mortar till the mixture melts. But heating accelerates in any instance of this invention the melting process of the components.

Solvents are also employed to dissolve the components of this invention. As such solvents are employed ethyl alcohol, methyl alcohol, acetone, ethyl ether, methyl ether, chloroform, benzol, xylol, and the like. The resulting solution is removed of the solvent by a suitable means like evaporating.

The freezing point of the liquid preservatives thus obtained is much lower than the melting point of each of the components. Whether or not any of said mixtures come to provide an eutectic substance a freezing point lower than room temperature depends upon composition of the components. When the freezing point of an eutectic substance obtained is higher than room temperature, one species of the components employed or any one species of the previously mentioned components other than the employed is further comelted with the mixture. Then the freezing point declines. The more species of components are employed in a mixture, therefore, it becomes the easier to obtain a desired substance of this invention. But any of liquid preservatives of this invention contains at least one species of p-hydroxybenzoic acid esters as an indispensable component, as stated before.

In Table 1 are shown a few instances of composition ratios forming eutectic compounds which are related to this invention, together with the freezing points of the compounds. Each of the compounds is consisting of at least 2 species of components. Those compounds having a freezing point higher than room temperature are also included in the table, because the freezing points of such compounds can be easily reduced to a temperature lower than room temperature as will be stated later.

Table 1

| Components | Melting point in °C. | Composition ratio in weight percent | Freezing point in °C. |
|---|---|---|---|
| n-butyl p-hydroxybenzoate | 70-71 | 59 | 44.9 |
| n-propyl p-hydroxybenzoate | 96 | 41 | |
| n-butyl p-hydroxybenzoate | 70-71 | 50 | 20.9 |
| i-propyl p-hydroxybenzoate | 84-85 | 50 | |
| n-butyl p-hydroxybenzoate | 70-71 | 40 | 19.5 |
| i-propyl p-hydroxybenzoate | 84-85 | 60 | |
| i-propyl p-hydroxybenzoate | 84-85 | 65 | 48.6 |
| n-propyl p-hydroxybenzoate | 96 | 35 | |
| i-propyl p-hydroxybenzoate | 84-85 | 58 | 48.8 |
| n-propyl p-hydroxybenzoate | 96 | 42 | |
| i-butyl p-hydroxybenzoate | 74-75 | 68 | 52.5 |
| n-propyl p-hydroxybenzoate | 96 | 32 | |
| i-butyl p-hydroxybenzoate | 74-75 | 55 | 53.2 |
| n-propyl p-hydroxybenzoate | 96 | 45 | |
| i-propyl p-hydroxybenzoate | 84-85 | 68 | 31.8 |
| i-butyl p-hydroxybenzoate | 74-75 | 32 | |
| i-propyl p-hydroxybenzoate | 84-85 | 45 | 27.8 |
| i-butyl p-hydroxybenzoate | 74-75 | 55 | |
| i-butyl p-hydroxybenzoate | 74-75 | 52 | 23.8 |
| n-butyl p-hydroxybenzoate | 70-71 | 48 | |
| i-butyl p-hydroxybenzoate | 74-75 | 31 | 25.9 |
| n-butyl p-hydroxybenzoate | 70-71 | 69 | |
| sec-butyl p-hydroxybenzoate | 57-58 | 64 | 27.5 |
| n-butyl p-hydroxybenzoate | 70-71 | 36 | |
| sec-butyl p-hydroxybenzoate | 57-58 | 50 | 28.3 |
| n-butyl p-hydroxybenzoate | 70-71 | 50 | |
| n-butyl p-hydroxybenzoate | 70-71 | 72 | 50.8 |
| α-methyl naphthoquinone | 105-107 | 28 | |
| n-butyl p,hydroxybenzoate | 70-71 | 71.5 | 49.8 |
| dehydroacetic acid | 109 | 28.5 | |
| n-butyl p-hydroxybenzoate | 70-71 | 80 | 61.0 |
| sorbic acid | 134.5 | 20 | |
| n-butyl p-hydroxybenzoate | 70-71 | 90 | 63.5 |
| salicylic acid | 157 | 10 | |
| n-butyl p-hydroxybenzoate | 70-71 | 57 | 53.7 |
| butyl hydroxytoluene | 68-70 | 43 | |
| butyl hydroxytoluene | 68-70 | 40 | 38.3 |
| butyl hydroxyanisole | ca. 56 | 60 | |

Table I—Continued

| Components | Melting point in °C. | Composition ratio in weight percent | Freezing point in °C. |
|---|---|---|---|
| n-butyl p-hydroxybenzoate | 70–71 | 82 | |
| propyl gallate | ca. 145 | 18 | } 60.0 |
| salicylic acid | 157 | 30 | |
| dehydroacetic acid | 109 | 70 | } 84.4 |
| n-butyl p-hydroxybenzoate | 70–71 | 37 | |
| 2, 4, 5-trichlorophenol | 63 | 63 | } 13.0 |
| n-butyl p-hydroxybenzoate | 70–71 | 40 | |
| i-propyl p-hydroxybenzoate | 84–85 | 20 | |
| i-butyl p-hydroxybenzoate | 74–75 | 40 | } 0–10 |
| n-butyl p-hydroxybenzoate | 70–71 | 30 | |
| i-butyl p-hydroxybenzaote | 74–75 | 40 | |
| sec-butyl p-hydroxybenzoate | 57–58 | 30 | } 0–10 |

Table 2

| Esters | Solubility in water at 20° C. Unit: γ/cc. |
|---|---|
| n-butyl p-hydroxybenzoate | 175 |
| n-propyl p-hydroxybenzoate | 300 |
| i-butyl p-hydroxybenzoate | 235 |
| sec-butyl p-hydroxybenzoate | 473 |
| i-propyl p-hydroxybenzoate | 725 |
| n-butyl p-hydroxybenzoate, 59 parts | } 290 |
| n-propyl p-hydroxybenzoate, 41 parts | |
| n-butyl p-hydroxybenzoate, 48 parts | } 410 |
| i-butyl p-hydroxybenzoate, 52 parts | |
| n-butyl p-hydroxybenzoate, 30 parts | |
| i-butyl p-hydroxybenzoate, 30 parts | } 980 |
| i-propyl p-hydroxybenzoate, 40 parts | |
| n-butyl p-hydroxybenzoate, 30 parts | |
| i-butyl p-hydroxybenzoate, 40 parts | } 1,010 |
| sec-butyl p-hydroxybenzoate, 30 parts | |

With any of the compounds shown in the table, having a freezing point higher than room temperature, one or more species of p-hydroxybenzoic acid esters other than the species employed in the compound or one or more species of α-methyl naphthoquinone, dehydroacetic acid, salicylic acid, sorbic acid, butyl hydroxyanisole, butyl hydroxytoluene, n-propyl gallate and i-amyl gallate are comelted. The reduction in the freezing point is remarkable. For instance, when 40 parts of sec-butyl p-hydroxybenzoate are comelted with the compound consisting of 40 parts of butyl hydroxytoluene and 60 parts of butyl hydroxyanisole, the freezing point is reduced from 38.3° C. to a temperature below 20° C. When 40 parts of i-butyl p-hydroxybenzoate are comelted with the compound consisting of 59 parts of n-butyl p-hydroxybenzoate and 41 parts of n-propyl p-hydroxybenzoate, the freezing point falls from 44.9° C. to approximately 15° to 20° C. In some instances of the eutectic substances of this invention, exact measurements of the lowest freezing point are hardly obtainable. Furthermore, the room temperature to which reference is made in this invention covers a range of temperature which is most conducive to the growth of organisms like molds. Said temperature also covers a range extending from a room temperature in the frigid zones to a room temperature in the tropical or torrid regions. The temperature may also differ according to seasonal changes, air conditioning, artificial heating, and the like.

In contrast to p-hydroxybenzoic acid esters in independent use, the most characteristic feature of this invention is that the liquid preservatives obtained, each of which contains at least one species of p-hydroxybenzoic acid esters as specified before, are all liquid at room temperature. Other various features and advantages of this invention can be derived from this specific point.

Firstly, the solubility of the p-hydroxybenzoic acid esters contained in the products of this invention is remarkably higher than each of said esters in independent use, so that the previously mentioned defect of said esters in independent use to the effect that the preservative efficacy of each of said esters is diametrically opposing to the solubility is entirely removed, and that the original preservative efficacy of each of said esters employed in this invention is additionally increased or sometimes multiplied. Because of high solubility, furthermore, the p-hydroxybenzoic acid esters contained in the products of this invention dissolve much more easily into the articles to be protected than is the case with the conventional art, and do not crystallize at room temperature. In Table 2 are shown relative solubilities of some of said esters in independent use as against those comelted in the products of the invention.

Secondly, the eutectic products of this invention can be easily emulsified in an aqueous solution containing such colloid protecting substances as gelatin, carboxymethyl cellulose, and the like, and a stable O./W. (oil-in-water) type emulsion is obtained in a simple manner. The crystallization of p-hydroxybenzoic acid esters which takes place in a dispersant when any of said esters is employed independently of one another, is thus eliminated.

Thirdly, each of the eutectic products of this invention easily comelts with any of butyl hydroxyanisole and butyl hydroxytoluene, so that the preservative efficacy of the esters comelted in the products of this invention comes to be provided with a new desired efficacy. For instance, when butyl hydroxytoluene is comelted with any of the eutectic substances of this invention containing p-hydroxybenzoic acid esters, the resulting mixture assumes the antioxidant efficacy of the newly added substance in addition to the original preservative efficacy.

Fourthly, being liquid at room temperature, any of the eutectic products of this invention easily forms a solution with, for instance, a 2-substituted 5-nitrofuran derivative, or forms a stable suspension with a polypeptide like "Nisin," a product of Aplin & Barrett Co. Ltd., London.

Fifthly, the p-hydroxybenzoic acid esters contained in the products of this invention are less volatile and non-crystallizing.

To employ the eutectic products of this invention, the article to be protected from the growth of molds and the like organisms, is coated with by spraying or by any other suitable means, or immersed in, or mixed with any of said eutectic products of this invention in the form of the liquid state itself or in a form of solution of a desired concentration or in a form of emulsion. Protecting media like wrapping materials including cellophane paper, parchment paper, polyethylene film, and the like are also treated with the products of this invention in the same manner. The operational advantages of this invention are therefore enormous. The products of this invention being employed as emulsions in particular, the application of said products is very easy and simple.

Preferred examples are as follows:

*Example 1.*—30 grams of n-butyl p-hydroxybenzoate, 49 grams of sec-butyl p-hydroxybenzoate and 21 grams of i-butyl p-hydroxybenzoate are mixed and heated to 70° C. to melt, and the melt is allowed to cool at room temperature. Freezing point ranges from 0° to 10° C.

*Example 2.*—30 grams of n-butyl p-hydroxybenzoate, 40 grams of i-propyl p-hydroxybenzoate and 30 grams of i-butyl p-hydroxybenzoate are triturated in a mortar at room temperature to form a melt. No heating is applied. Freezing point ranges from 10° to 15° C.

*Example 3.*—38 grams of n-butyl p-hydroxybenzoate and 62 grams of sec-butyl p-hydroxybenzoate are mixed and heated to 70° C. to melt. After cooling at room temperature, the mixture is added to 400 cc. of water containing 2 grams of gelatin. The solution is violently shaked to emulsify. 5 cc. of the resulting emulsion are added to 5 liters of soy sauce warmed to 70° C. The sauce is allowed to cool at room temperature and then to stand at 30° C. for days. No mold is formed in the sauce for 50 days.

*Example 4.*—3 grams of n-butyl p-hydroxybenzoate, 4 grams of i-propyl p-hydroxybenzoate and 3 grams of i-butyl p-hydroxybenzoate are mixed and heated to 70° C. to form a mixture with a freezing point ranging from 0° to 10° C. After cooling, 10 grams of aqueous solution containing 1% of gelatin are added. The solution is shaked to emulsify.

*Example 4a.*—The emulsion thus obtained is mixed with one liter of soy sauce warmed to 70° C. The sauce is then allowed to cool at room temperature and to stand at 30° C. for days for the purpose of observing mold formation therein. Results are:

70 γ/cc.—No mold is formed for 50 days;
60 γ/cc.—No mold is formed for 50 days;
50 γ/cc.—No mold is formed for 43 days;
40 γ/cc.—No mold is formed for 13 days; and
30 γ/cc.—No mold is formed for 7 days.

*Example 4b.*—5 pieces of apples, weighing 527 grams, are crushed to yield 312 cc. of apple juice. Water and 25 grams of sugar are added to make the entire amount to 400 cc. After dividing into two equal portions, 0.1 cc. of the aforementioned emulsion is mixed with one portion with shaking, and both portions are allowed to stand for days at 28° C. under 95% humidity. Control portion starts to mold 4 days later, but the treated portion forms no mold even after 70 days.

*Example 5.*—3 grams of i-butyl p-hydroxybenzoate, 3 grams of sec-butyl p-hydroxybenzoate, 1 gram of i-amyl p-hydroxybenzoate, 3 grams of i-propyl p-hydroxybenzoate and 1.5 gram of α-methyl naphthoquinone are mixed with ethyl alcohol to form 20 grams of 97% ethyl alcohol solution. Solvent is removed by evaporating. Freezing point ranges from 0° to 10° C. The mixture is then sprayed in the order of 1 g./m.² on parchment papers for protecting cheese. Mold formation is 0.2% as against 4.1% of control. Experiments are performed at 27° C. for 40 days under 85% humidity.

*Example 6.*—3 grams of n-butyl p-hydroxybenzoate, 2 grams of i-amyl p-hydroxybenzoate, 2 grams of i-butyl p-hydroxybenzoate, 3 grams of i-propyl p-hydroxybenzoate and 1 gram of salicyclic acid are mixed and heated to 70° C. to melt, and the melt is allowed to cool to yield a liquid at room temperature. 10 grams of the liquid thus obtained are then sprayed on 4 kilograms of tangerines, and each of the treated tangerines is immediately sealed up in a polyethylene wrapper for storing for 40 days at 25° C. under 90% humidity. 2.1% are affected with molds. Others retain normal appearance. Slightly wrinkled.

*Example 7.*—3 grams of n-butyl p-hydroxybenzoate, 3 grams of i-butyl p-hydroxybenzoate, 4 grams of i-propyl p-hydroxybenzoate and 1 gram of α-methyl naphthoquinone are mixed and heated to 70° C., and the melt is allowed to cool at room temperature to form an eutectic product with a freezing point below 7° C.

Having described our invention as related to various preferred products of the same and their preferred applications, it is our intention that the invention be not limited by any of the details of description unless otherwise specified, but rather be construed broadly within its spirit and scope as set out in the accompanying claim.

What we claim is:

A liquid preservative composition comprising at least two p-hydroxybenzoic acid esters selected from the group consisting of p-hydroxybenzoic acid benzyl ester and p-hydroxybenzoic acid alkyl esters, the alkyl groups of which contain 1–5 carbon atoms, in such proportions that their mixture has a freezing point below room temperature.

References Cited in the file of this patent
UNITED STATES PATENTS 1,879,351    Lehmann _____ Sept. 27, 1932
2,580,461    Pearl _____ Jan. 1, 1952